S. O. MARTIN.
DITCHING PLOW.
APPLICATION FILED JULY 5, 1918.
1,311,829.
Patented July 29, 1919.
2 SHEETS—SHEET 1.
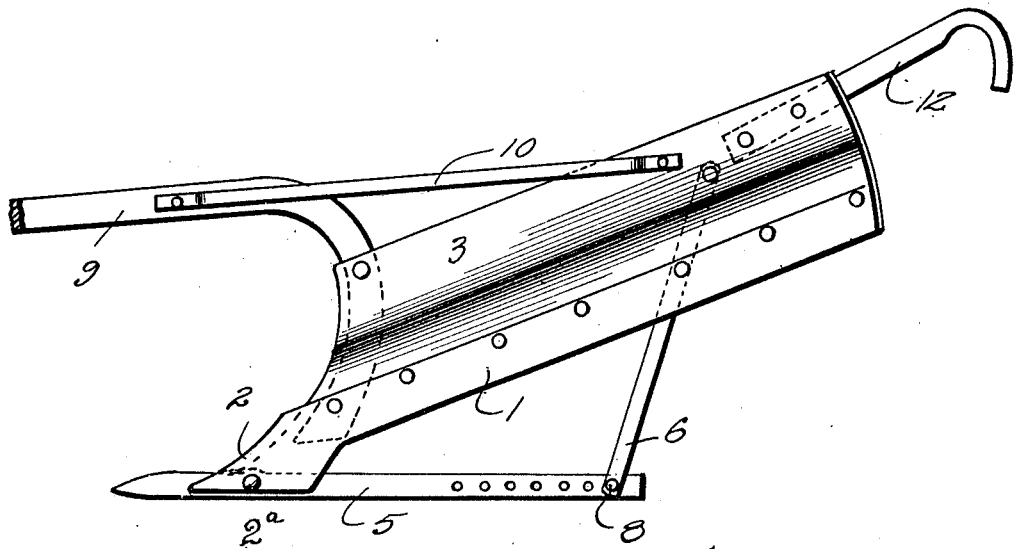
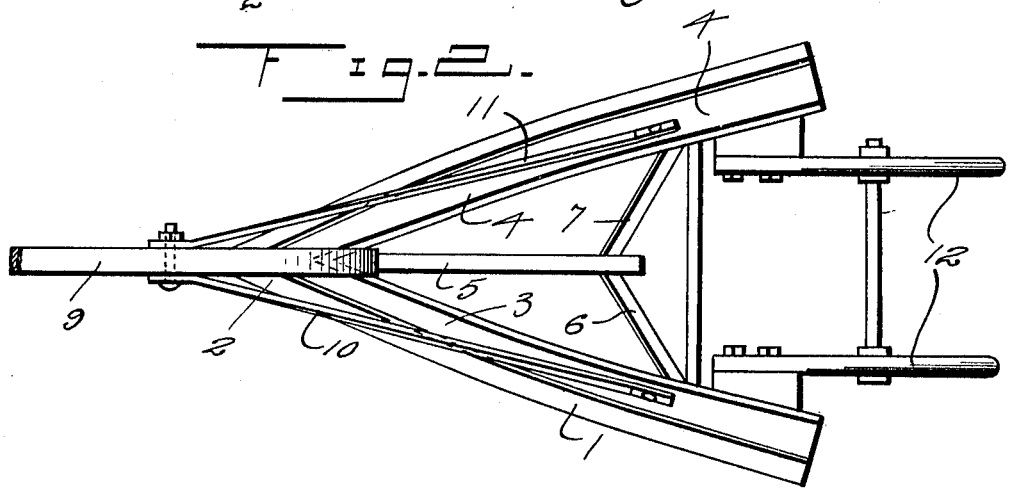
Inventor
Scott O Martin
By Frederick L. Fishback
Attorney

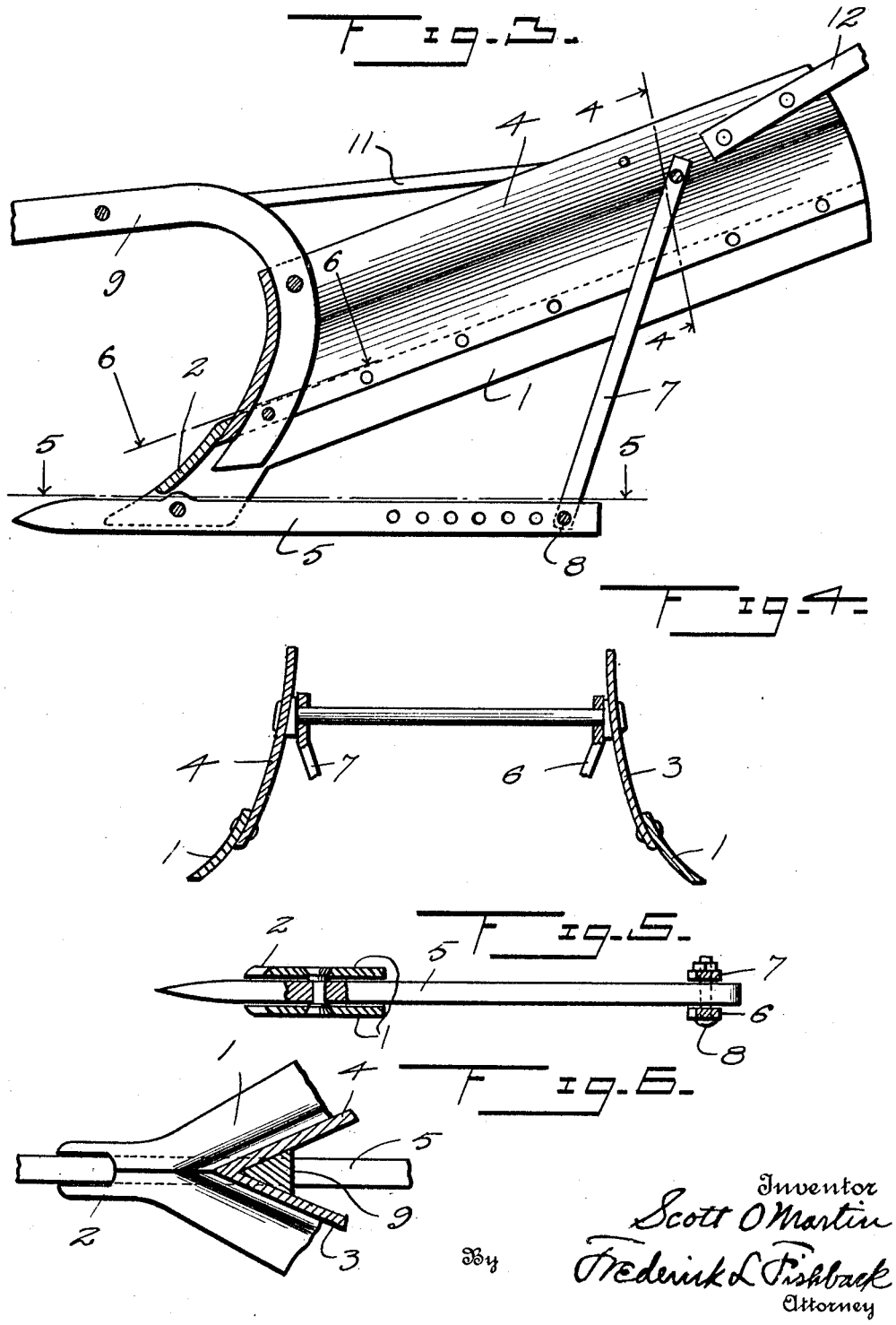

UNITED STATES PATENT OFFICE.

SCOTT O. MARTIN, OF LAMAR, COLORADO.

DITCHING-PLOW.

1,311,829. Specification of Letters Patent. Patented July 29, 1919.

Application filed July 5, 1918. Serial No. 243,343.

*To all whom it may concern:*

Be it known that I, SCOTT O. MARTIN, a citizen of the United States, residing at Lamar, in the county of Prowers and State of Colorado, have invented certain new and useful Improvements in Ditching-Plows, of which the following is a specification.

My invention relates to ditching plows.

The object of my invention is to produce a plow of said character in which the depth and width of the furrow may be regulated. A further object thereof is to produce a ditching plow provided with curved blades and mold boards adapted to throw the soil on both sides of the furrow of a predetermined depth and width. A further object of my invention is to produce a more simple, cheap, and efficient device of said character than has heretofore been attained.

To these ends my invention includes the combination and arrangement of component parts to be hereinafter described and more particularly pointed out in the claims.

In the accompanying drawings in which like reference characters indicate similar parts, Figure 1 is a side view of my invention;

Fig. 2 is a plan view;

Fig. 3 is a sectional view thereof, showing the plow tilted in its highest position; and Fig. 4 is a cross sectional view on the line 4—4 of Fig. 3.

Fig. 5 is a plan view of the running bar,

Fig. 6 is a sectional view on the line 6—6 of Fig. 3.

Referring now to the drawings, 1 indicates divergently disposed shares to the upper margins of which are secured the mold boards 3 and 4 that are transversely curved. As shown in the drawings, particularly in Fig. 2, said mold boards are also outwardly curved from their front to their rear ends.

The front ends 2 of the shares are attached to the running bar 5 by a pivot 2ᵃ and said running bar extends rearwardly and is provided with a plurality of transverse orifices whereby the lower ends of the brace rods 6 and 7 may be secured as by a bolt 8, entering any of said orifices. Said brace rods at their upper ends are pivoted to the mold boards on the inner faces thereof.

It will be obvious that the height and angle of the shares and mold boards may be regulated by the adjustment of the brace rods in the various orifices of the running rod.

The plow of my invention is provided with a beam 9 upon which the shares and mold boards may be secured and braced by the rods 10 and 11. It will also be provided with handles 12 of ordinary construction.

Having thus described my invention, what I claim as new, and desire to be secured by Letters Patent, is—

1. A plow of the character described, comprising a pair of assembled divergently disposed share members, a pair of mold boards secured to and extending above said share members, a running bar attached to said share members adjacent to their front ends and extending rearwardly, said mold boards being capable of vertical swinging movement, a pair of depending brace rods pivotally secured at their upper ends to said mold boards, and means for adjustably securing said brace rods at their lower ends to said running bar at different points longitudinally along the same.

2. A plow of the character described, comprising a longitudinally disposed running bar having a plurality of transverse openings at different points along the same, divergently-disposed mold boards having a pivotal connection with the running bar adjacent to its front end, said mold boards being capable of vertical movement with respect to the running bar, depending brace rods pivotally secured to the mold boards and having their free ends movable to different positions longitudinally along the running bar, and fastening means for the said ends of the brace rods arranged to engage in the different openings of the running bar.

SCOTT O. MARTIN.

Witnesses:
FLORA E. BURGER,
A. T. HARLEY.

Copies of this patent may be obtained for five cents each, by addressing the "Commissioner of Patents, Washington, D. C."